United States Patent [19]

Nakasu

[11] 4,345,672
[45] Aug. 24, 1982

[54] ALARM DEVICE FOR A BRAKE CLEARANCE LIMIT IN AN AIR-OVER-HYDRAULIC BRAKE SYSTEM

[75] Inventor: Kei Nakasu, Toyota, Japan

[73] Assignee: Toyota Jidosha Kogyo Kabushiki Kaisha, Aichi, Japan

[21] Appl. No.: 74,713

[22] Filed: Sep. 11, 1979

[30] Foreign Application Priority Data

Dec. 29, 1978 [JP] Japan .................................. 53-165192

[51] Int. Cl.³ ............................................ F16D 66/00
[52] U.S. Cl. .................................... 188/1.11; 92/5 R; 137/806; 340/52 A
[58] Field of Search .................. 188/151 A, 152, 1 A, 188/1 R, 1.11; 303/114; 92/5 R; 340/52 A, 626, 52 C, 242; 137/86, 806; 116/272, 280, 208; 200/82 D, 82 R, 82 C, 83 B

[56] References Cited

U.S. PATENT DOCUMENTS 3,997,887 12/1976 Poynter ......................... 200/82 D X
4,201,974 5/1980 Fima ................................ 188/1 A X
4,207,565 6/1980 Isakson et al. ..................... 92/5 R X Primary Examiner—Douglas C. Butler
Attorney, Agent, or Firm—Browdy and Neimark

[57] ABSTRACT

An alarm device for a brake clearance limit in an air-over-hydraulic brake system wherein air pressure piston drives a hydraulic piston for producing braking hydraulic pressure in a hydraulic brake system, capable of giving a warning at a certain constant brake clearance, irrespective of the height of pressure in the hydraulic brake system. The device comprises a sensor of hydraulic pressure for detecting a hydraulic pressure P in the hydraulic brake system, a sensor of shift amount l of the air-pressure piston after the moment when the permissible limit of brake clearance has been reached and all of the gaps in the hydraulic brake system have been lost, and a warning element which gives a warning signal when a formula $l > \alpha \cdot P$ is satisfied, wherein $\alpha$ designates rigidity coefficient of the hydraulic brake system, i.e., a quotient of the increased shift amount of the hydraulic piston divided by the increased amount of the hydraulic pressure. It is not, in this invented device, at a moment when the air pressure piston has been moved to a fixedly set position but at a moment when the same piston has been moved to a position where a shift amount corresponding to elastic deformation of the hydraulic brake system has been automatically compensated, that the warning signal is given.

13 Claims, 7 Drawing Figures

SERIES OF 203 & 223 TO LIGHT 220

REACTION SENSING TRANSFORMER

ALARM DEVICE FOR A BRAKE CLEARANCE LIMIT IN AN AIR-OVER-HYDRAULIC BRAKE SYSTEM

BACKGROUND OF THE INVENTION

This invention relates to an alarm device for giving a warning upon reaching the limit of brake clearance, more particularly, to an alarm device for use in an air-over-hydraulic brake system wherein an air pressure piston actuated by a compressed or pressurized air source drives a hydraulic piston for producing hydraulic pressure in a hydraulic brake system.

It is required in an air-over-hydraulic brake system that when brake clearance, i.e., the clearance between the brake element and the rotating member, such as a drum or a disc, in a brake's released state, has reached a predetermined limit, that fact should be conveyed to the driver by means of an alarm device. This occurs, of course, due to normal wearing of the brake element, such as brake shoes or brake pads bearing against the drum or disc. In conventional practice, the driver is warned by means of a sensor which detects an increase of shifting amount of the air pressure piston beyond a certain predetermined value.

Unfortunately conventional alarm devices are liable to give a warning signal prematurely, i.e., before brake clearance has actually reached the permissible limit, particularly when the hydraulic pressure is increased for any reason, for example, by an emergency braking operation. The phenomenon is caused by the fact that conventional devices are designed to give a warning signal whenever the shifting amount of the air pressure piston has reached a certain predetermined amount. In reality, the shifting amount of the air pressure piston also includes, in addition to the shifting amount corresponding to brake clearance, a shifting amount corresponding to elastic deformation of components of the hydraulic brake system, such as the brake hose or the brake tube which is increased substantially in proportion to the rising of the hydraulic pressure in the hydraulic brake system. If the predetermined value should be set at the shifting amount of the air pressure piston in case of an emergency braking so as to avoid the above-mentioned disadvantage, the alarm might not be given in an ordinary braking operation, irrespective of whether the permissible limit of the brake clearance is actually reached. Thus conventional systems can be very dangerous.

SUMMARY OF THE PRESENT INVENTION

It is a primary object of this invention to provide an alarm device for a brake clearance limit, which eliminates the disadvantages of the prior art, which is controlled by hydraulic pressure in the hydraulic brake system, and which is capable of giving a warning signal consistently at a certain predetermined brake clearance independently of the hydraulic pressure and other factors effecting the system.

Another object of this invention is to attain the above-mentioned purpose by providing the most structurally simple and inexpensive device possible.

The invention alarm device for brake clearance limit comprises a sensing means for sensing the hydraulic pressure P in the hydraulic brake system of an air-over-hydraulic brake system, another sensing means for sensing the shifting about l of the air pressure piston from a position where the hydraulic pressure starts to be generated in the hydraulic brake system when the permissible brake clearance limit has been reached, and warning means for giving a warning signal whenever the following inequality is established:

$$l > \alpha \cdot P$$

wherein $\alpha$ is the reciprocal of the rigidity coefficient of the hydraulic brake system obtained by dividing the increased shifting amount of the air pressure piston after the disappearance of brake clearance by the increased amount of the hydraulic pressure. The reciprocal is used herein as a convenience, and $\alpha$ can also be thought of as an expansion constant.

In this invention a warning signal is given when the air pressure piston has been shifted to a position where a shift amount corresponding to the elastic deformation of the hydraulic brake system has been automatically compensated for. Conventional devices give a warning signal when the air pressure piston of a brake booster has been shifted up to a fixed predetermined position. This invention has enabled giving a warning signal to the driver exactly when the brake clearance has reached a predetermined permissible limit, without being affected by the value of the hydraulic pressure in the hydraulic brake system. The invention eliminates the disadvantage of conventional devices wherein a warning signal is sometimes given before the permissible limit has been reached in a high pressure range. Further, in such conventional devices, the warning signal is sometimes not given, in a low pressure range, despite the brake clearance limit having been exceeded.

DETAILED DESCRIPTION OF THE PREFERRED EMBODIMENTS

With reference to the appended drawings some of the preferred embodiments will be described below. The protection granted however should not be interpreted to be limited to the embodiments disclosed, which are to aid in understanding by way of example only.

Figure 1:
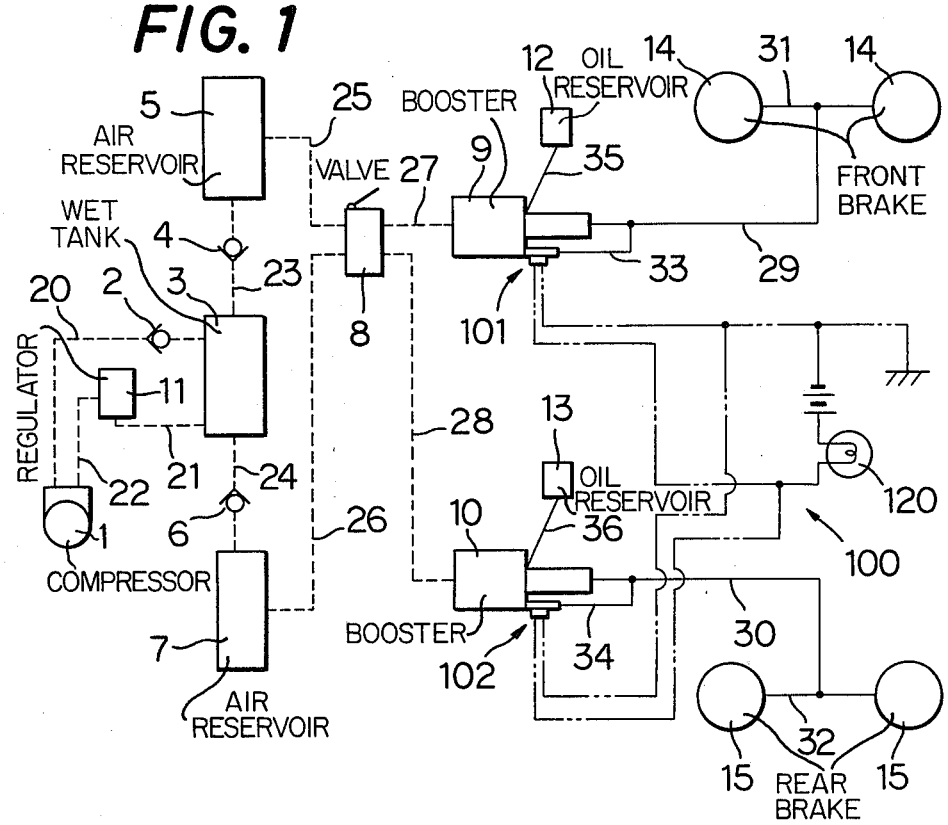
FIG. 1 is a circuit diagram of an air-over-hydraulic brake system including a warning device of an embodiment of this invention.

FIG. 1 shows a circuit diagram of an air-over-hydraulic brake system including a warning device of this invention, in which pipings of the air circuit are shown in broken lines, pipings of the hydraulic brake circuit are shown in solid lines, and electrical wiring is shown in two dot chain lines.

Compressed (pressurized) air from a compressor 1 is fed, via a conduit 20 and check valve 2, to a wet tank 3, where it is dried by being cooled to condense out the moisture. Air pressure in the wet tank 3 is kept constant by regulating a suction valve of the compressor 1 by means of conduits 21, 22 and a regulator 11. The compressed air in the wet tank 3 is delivered to both air reservoirs 5 and 7 through a conduit 23 and a check valve 4, and a conduit 24 and a check valve 6, respectively. The pressurized air in the air reservoirs 5 and 7 is, due to operation of a valve 8 by the driver, supplied to boosters 9 and 10 by way of conduits 25, 27 and 26, 28, respectively, wherein the air will generate hydraulic pressure.

Figure 2:
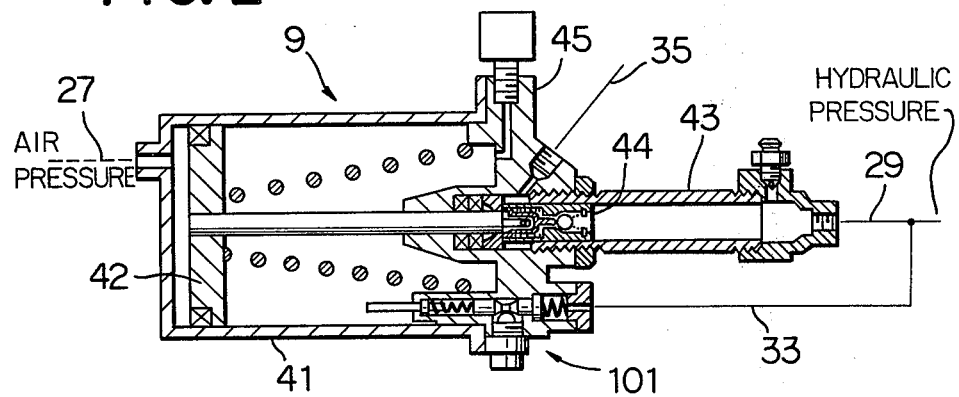
FIG. 2 is an enlargement, in elevational section, of a booster in FIG. 1.

In the booster 9 shown in FIG. 2, an air pressure piston 42 is axially movably and is fitted air-tight in a casing 41. A hydraulic pressure piston 44 is driven by the air pressure piston 42 for producing hydraulic pressure in a cylinder 43. The booster 9 functions to convert the air pressure fed through the conduit 27 to a greater hydraulic pressure of higher level. The hydraulic pressure produced in the booster 9 is, via conduits 29, 31 transferred to front brakes 14 disposed on both front wheels. This circuit will be called hereinafter a front hydraulic circuit. The booster 10 is similarly constructed and arranged as the booster 9 so as to function to actuate rear brakes 15 via conduits 30, 32. This circuit will be hereinafter called a rear hydraulic circuit. Numerals 12 and 13 designate, respectively, an oil reservoir for supplying brake fluid to the boosters 9 and 10 through conduits 35, 36, respectively.

On each of the boosters 9, 10 is attached a sensor head 101, 102, respectively, of an alarm device 100 brake clearance limit. The sensor head 101 (102) senses or detects reaching of the brake clearance limit owing to shifting amount of the air pressure piston 42 of the booster 9 (10) and hydraulic pressure in the front (rear) hydraulic circuit which is fed by the conduit 33 (34), for giving a warning signal by lighting a lamp 120. The sensor head 101 is shown in enlargement in FIG. 3, the other head 102 is the same as head 101.

Figure 3:
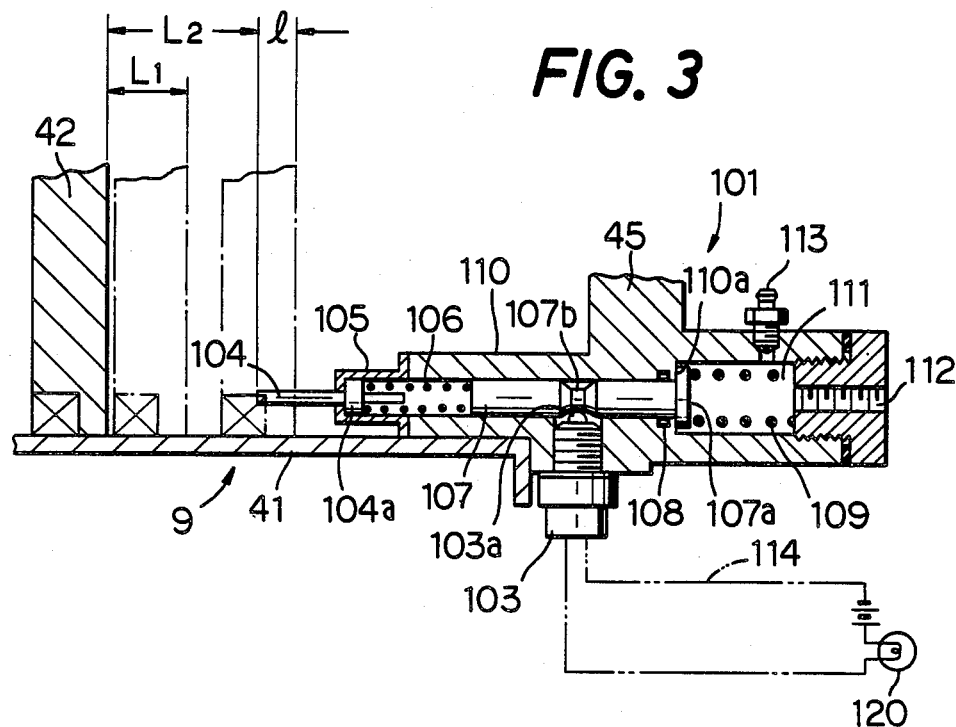
FIG. 3 is a further enlargement, in elevational section, of the sensing means according to this invention.

The main body 110 of the sensor head 101 is integrally formed in end plate 45 of booster 9 near its radially outermost portion. A pressure-sensing piston 107 is slidably fitted in body 110. The pressure-sensing piston 107 is biased leftward (in FIG. 3) by a spring 109. When hydraulic pressure is generated in the front hydraulic circuit the pressure-sensing piston 107 is further urged leftward by that hydraulic pressure which is fed through a port 112 into a hydraulic fluid chamber 111. The shifting of the piston 107 beyond a certain limit shown in FIG. 3 is, however, restricted by abutment of a head portion 107a of the piston 107 against a shoulder surface 110a of the main body 110. Numeral 108 designates a seal ring and 113 designates a bleeder.

In the middle portion of the pressure-sensing piston 107 there is formed an annular groove 107b of trapezoidal configuration in section, in the peripheral direction. On the bottom of groove 107b there is engaged an actuator 103a of a sensing shitch 103, which is threaded into the main body 110 from the flank thereof. The switch 103 is in an OFF state in FIG. 3. When the pressure sensing piston 107 is shifted rightwardly by virtue of a spring 106 to push the actuator 103a in, an alarm circuit 114 is closed to light alarm lamp 120.

On the tip of the main body 110 is secured a guide cylinder 105, in which a rod 104 for detecting the shifting amount is axially movably fitted. The rod 104 is provided with a large diameter portion 104a in the middle portion thereof. A compression spring 106 is sandwiched between the large diameter portion 104a and the pressure-sensing piston 107. The spring 106 is placed with a weak preset load, for example, of 3 kg, and the spring 109 is set with a slightly larger pre-load, for example, 4 kg. The pressure-sensing piston 107 and the rod 104 are normally held at the positions illustrated in FIG. 3 (hereinafter called forwardmost advanced position), with a certain length of the end portion of the rod 104 protruding out from the guide cylinder 105. The set load of the spring 109 is higher than that of the spring 106, however, the spring constant of the spring 106 is considerably higher than that of the spring 109. In other words, the spring 109 functions only to retain the pressure sensing piston 107 at the forwardmost advanced position. The operation of the pressure sensing piston 107 depends on the spring force of the spring 106 and the urging force due to the hydraulic pressure fed to the hydraulic fluid chamber 111. The spring constant K of the spring 106 and the pressure receiving area S of the pressure sensing piston 107 are so determined as to satisfy the following equation:

$$S/K = \alpha \qquad (1)$$

wherein $\alpha$ designates the reciprocal of the rigidity coefficient or the expansion constant of the front hydraulic pressure circuit (a quotient of the increased amount of shifting of the hydraulic pressure piston 44 divided by the corresponding increase amount of the hydraulic pressure).

The operation of the device will be explained with reference to FIGS. 4 and 5. After the brake clearance of the front brake has been adjusted to a normal value, when the shift amount of the air pressure piston 42 has reached $L_1$ all of the other clearances (gaps) among various brake components, in addition to the brake clearance, are absorbed. Thereafter the shift amount of the air pressure piston 42 (that is equal to the shift amount of the hydraulic pressure piston (44) is increased along the straight line I in FIG. 4 in accordance with the increase of the hydraulic pressure in the front hydraulic circuit from 0 to $P_{max}$. The slope of the straight line I is the aforementioned expansion constant $\alpha$.

If the brake clearance is increased due to wear of the brake element, such as brake shoes or brake pads, the shift amount of the the air pressure piston 42 is increased by the corresponding amount of the wear, which can be indicated by a straight line II parallel to the straight line I. Assuming the shift amount of the air pressure piston 42 is $L_2$ when the hydraulic pressure in the front hydraulic circuit begins to be generated at the moment of reaching the permissible limit of the brake clearance, the shift amount $L_2$ will increase along the straight line II indicated in FIG. 4.

The air pressure piston 42 and the rod 104 are relatively so positioned to abut each other when the shift amount of the air pressure piston 42 reaches $L_2$, so that at the moment of reaching the permissible limit of the brake clearance, compression of spring 106 by the rod 104 begins simultaneously with the rising of the hydraulic pressure in the front hydraulic circuit. This situation can be graphically indicated as the straight line II' in FIG. 5, by taking the compression amount l of the spring 106 on the ordinate and the hydraulic pressure P in the front hydraulic circuit on the abscissa. This straight line II' can be expressed by the following equation:

$$l = \alpha \cdot P. \qquad (2)$$

When the aforementioned first equation is substituted into the second equation, the following equation is obtained:

$$K \cdot l = S \cdot P \quad (3)$$

This equation (3) proves that the spring force K·l of the spring 106 is always equal to the urging force S·P which the hydraulic pressure P in the front hydraulic circuit affects on the pressure sensing piston 107, regardless of the size of the hydraulic pressure. Even if the spring 106 had a larger spring force, in this situation, due to compression thereof caused retroactively by the shifting of the rod 104 under urging of the air pressure piston 42, the spring force can be just offset by the urging force, acting on the pressure sensing piston 107, of the hydraulic pressure in the front hydraulic circuit. It restricts the movement of the pressure sensing piston 107, consequently preventing the lighting of alarm lamp 120.

Figure 5:
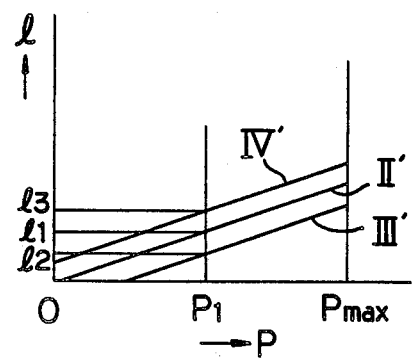

If, on the other hand, the brake clearance is smaller than the permissible limit the compression amount l of the spring 106 and the hydraulic pressure P of the front hydraulic circuit are to vary along the straight line III' in FIG. 5. The compression amount $l_2$ corresponding to a given hydraulic pressure $P_1$ in the front hydraulic circuit is then smaller than the compression amount $l_1$ of the spring 106 corresponding to the hydraulic pressure $P_1$ at the moment when the brake clearance has reached the permissible limit. Therefore, in this case, the following formula can be established:

$$K \cdot l_2 < K \cdot l_1 = S \cdot P_1$$

As can be seen here, the spring force $K \cdot l_2$ of the spring 106 turns out to be smaller than the urging force $S \cdot P_1$ due to the hydraulic pressure, causing the leftward urging of the pressure sensing piston 107 in FIG. 3. The piston 107 can not, however, be shifted because of the abutment of its head portion 107a onto shoulder surface 110a, thus preventing lighting of the alarm lamp 120.

Once the permissible limit of the brake clearance is exceeded, the compression amount l of the spring 106 and the hydraulic pressure P of the front hydraulic circuit moves along the straight line IV' in FIG. 5. The compression amount $l_3$ of the spring 106 corresponding to a given hydraulic pressure $P_1$ in the front hydraulic circuit is larger than the compression amount $l_1$ corresponding to the hydraulic pressure $P_1$ at the moment when the permissible limit has been reached. Therefore, the following formula can be established:

$$K \cdot l_3 > K \cdot l_1 = S \cdot P_1$$

Thus, the spring force $K \cdot l_3$ of the spring 106 turns out larger than the urging force $S \cdot P_1$ due to the hydraulic pressure to push the pressure sensing piston 107 rightwardly in FIG. 3. The sensing switch 103 will be turned ON to light the alarm lamp 120.

As can be clearly understood from the above description, in the area below the straight line II' in FIG. 5, that is the straight line II in FIG. 4, the alarm lamp 120 will not be lit, in this embodiment. On the contrary, it is lit in the upper area beyond the straight line II'. However, even if the pressure in the front hydraulic circuit is raised higher the alarm lamp 120 will not be lit unless the permissible limit of the brake clearance is reached. Once the permissible limit has been reached (to be more exact when the limit has been slightly exceeded) the alarm lamp 120 is lit regardless of the value of the hydraulic pressure in the front hydraulic circuit.

What is described about the sensing head 101 for detecting the limit of the brake clearance in the front brake 14 holds entirely similarly true for the sensing head 102 for detecting the limit of the brake clearance in the rear brake 15. Reaching the permissible limit of brake clearance in this case is also alerted by lighting of the alarm lamp 120.

Figure 4:
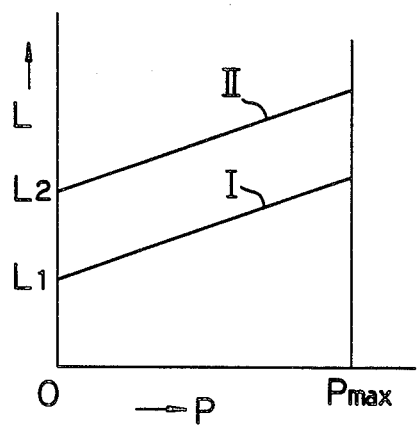
FIGS. 4 and 5 are graphs to aid in explaining the operation of the device shown in FIGS. 1-3.

It should be added herewith as a supplementary comment that relation between the shift amount of the air pressure piston 42 and the hydraulic pressure in a hydraulic brake system can not actually be described as a relation between a vertical line (ordinate) and an inclined straight line, as shown in FIG. 4. Technically, it should be described, to be exact, as a curve approximating a straight line. The above explanation simplifies understanding the concepts. In the above description, furthermore, the slide resistance of the pressure sensing piston 107, the force required for operating the sensing switch, etc., have not been considered as they are minor elements. If one or more of these elements should be significant in a particular embodiment, then of course they would have to be taken into consideration.

Figure 6:
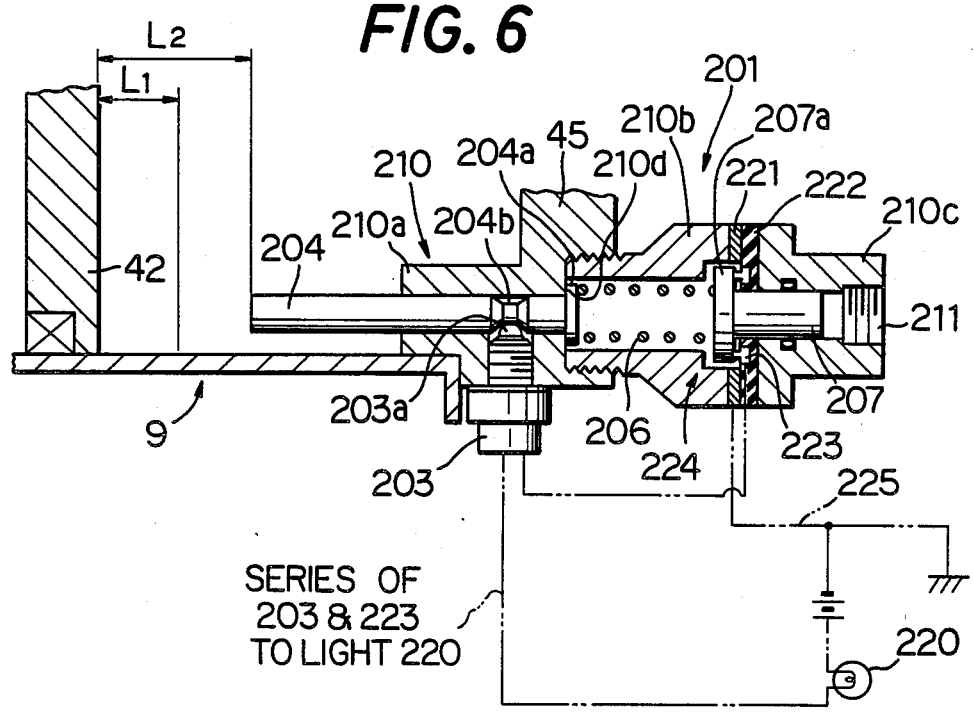
FIG. 6 is an elevational section of another embodiment of the part drawn in FIG. 3.

FIG. 6 which corresponds to FIG. 3, shows a second embodiment of the sensor head of this invention. Parts the same as or similar to these decribed above in relation to FIG. 3 are indicated by the same reference numerals and letters increased by 100. Therefore, only what is different from FIG. 3 will be described in detail below. Main body 210 of the sensing head 201 is composed of a tip portion 210a integrally formed with the same end plate 45 of the booster 9. An intermediate portion 210b is threaded into the end plate 45, and an end portion 210c is secured to the intermediate portion 210b with a terminal plate 221, and an isolation plate 222 is interposed therebetween. Within the main body 210 are disposed a rod 204 for detecting the shift amount of the air pressure piston 42 and a pressure sensing piston 207 for detecting the hydraulic pressure in the hydraulic brake system. Rod 204 and piston 207 are mounted in tandem and parallel to the axis of the air pressure piston 42. A weak compression spring 206 is interposed between the two members (204 and 207). The rod 204 is thus normally retained with its head portion 204a abutted on a shoulder surface 210d of the main body 210, while a head portion 207a of the pressure sensing piston 207 is abutted onto a fixed contact 223 secured to the isolation plate 222.

The middle portion of the rod 204 is peripherally formed with an annular groove 204b of trapezoidal shape in section, in which is engaged an actuator 203a of a first sensing switch 203 secured to the main body 210. The sensing switch 203 is in an OFF state in FIG. 6 when the actuator 203a is projecting out, and it will be turned ON when the actuator 203c is pushed in. This first sensing switch 203 is incorporated in series in an alarm circuit 225 with a second sensing switch 224 which comprises the fixed contact 223 and the pressure sensing piston 207, which also functions as a movable contact. An alarm lamp 220 can be lit only when both the first and the second sensing switches 203, 224 are turned ON.

The end portion of the pressure sensing piston 207 is exposed to a hydraulic pressure fluid chamber 211, into which the hydraulic pressure in the hydraulic brake system is fed. The area S of the pressure receiving face of the piston 207 and the spring constant K of the spring 206 are so determined, as in the previous embodiment, so that the ratio S/K should be equal to the expansion constant α of the hydraulic break system. The relative position between the air pressure piston 42 and the rod 204 is so determined as to abut to each other when the permissible limit of the brake clearance has been reached and when hydraulic pressure begins to be generated in the hydraulic brake system, as in the previous embodiment.

The sensing head 201 in this second embodiment is, while the brake is released, in a state shown in FIG. 6, that is, the second sensing switch is in ON state and the first sensing switch is in OFF state, preventing the alarm lamp 220 from being lit.

Even when the air pressure piston 42 pushes the rod 204 to turn the first sensing switch 203 ON prior to reaching of the permissible limit of the brake clearance, the alarm lamp 220 will not be lit, because the leftward urging force of the hydraulic pressure chamber 211 is larger than the force of the spring 206 which urges the pressure sensing piston 207 rightwardly, as in the previous embodiment, and the head portion 207a of the pressure sensing piston 207 is kept away from the fixed contact 223.

When the air pressure piston 42 pushes the rod 204 after the brake clearance has reached the permissible limit, the force of spring 206 becomes larger than the urging force due to the hydraulic pressure in the hydraulic pressure chamber 211, just as in the previous embodiment. The pressure sensing piston 207 is kept to be abutted in this instance, on the fixed contact 223 to make both the first and second sensing switches 203, 224 turn ON, to thus light the alarm lamp 220.

As can be understood clearly from the above description, the fact of having reached the permissible limit of the brake clearance is, in this embodiment, too, regardless of the height of the hydraulic pressure in the hydraulic brake system, to give a warning.

Figure 7:
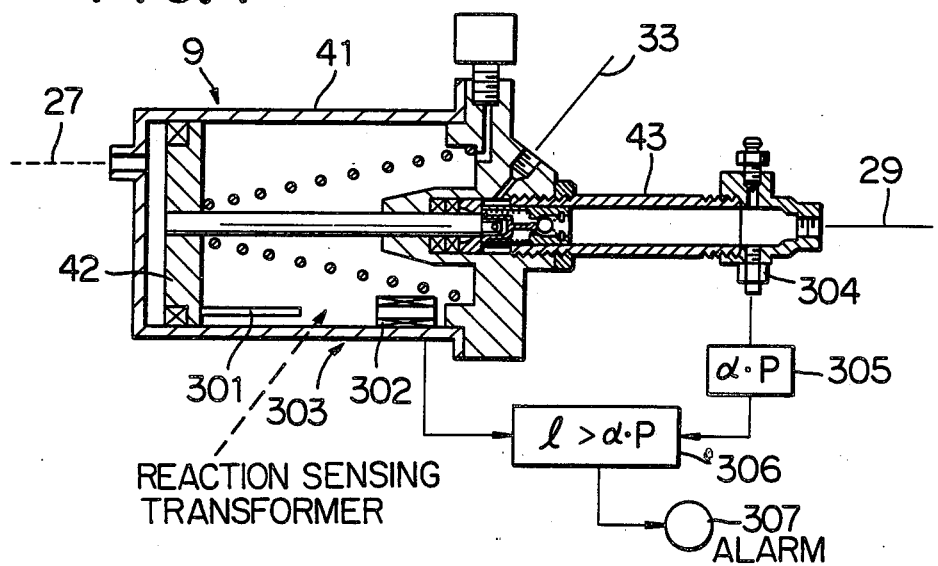
FIG. 7 is an explanatory view of another embodiment of the booster showing a third embodiment of the sensing means using an electrical system.

A third embodiment will be described with reference to FIG. 7, wherein a differential transformer generally designated 303 comprises a rod 301 secured on the air pressure piston 42 of the booster 9 and a coil 302 fixed on the casing 41. The differential transformer 303 is constructed so that when the brake clearance has reached the permissible limit and when at the same time the air pressure piston 42 has shifted up to a position where the hydraulic pressure in the hydraulic brake system begins to rise, the rod 301 comes into the coil 302 for continuously outputting a voltage corresponding to the shift amount l of the air-pressure piston 42.

A pressure gage 304 secured to the cylinder 43 outputs a voltage corresponding to the hydraulic pressure P in the cylinder 43, which voltage is input to a multiplier 305 for obtaining a product of that output multiplied by a pre-set expansion constant α of the hydraulic brake system.

The output α·P from the multiplier 305 and the output from the differential transformer 303 are compared in a comparator 306 which outputs a signal of high level only when l>α·P is satisfied. That signal activates warning means 307, such as an alarm lamp or alarm buzzer.

In the first two embodiments, the shift amount l of the air pressure piston 42 (shift amount from a position where the hydraulic pressure begins to be generated in the hydraulic brake system at the time when the brake clearance has reached the permissible limit) is converted, for judging the condition of l>α·P, into the form of a force K·l by means of the spring 106 (206). This force K·l is compared with the urging force S·P based on the hydraulic pressure P acting on the pressure sensing piston 107 (207). In this embodiment the shift amount l and the hydraulic pressure P are both converted into voltages for making comparison between the two easier.

What is claimed is:

1. In an air-over-hydraulic brake system, wherein an air pressure piston actuated by pressurized air drives a hydraulic piston to produce hydraulic pressure in a hydraulic brake system, an alarm device for giving a warning when a permissible limit of a brake clearance has been reached comprising:

hydraulic pressure sensing means for detecting a hydraulic pressure P in said hydraulic brake system;

shift amount sensing means for detecting a shift amount l of said air pressure piston, at a brake operation time just when said permissible limit of the brake clearance has been reached, from a position where the brake clearance has just been lost; and warning means for warning a driver of a vehicle when a formula $$l > \alpha \cdot P$$

has become to be satisfied; wherein α is an expansion constant of said hydraulic brake system which is a quotient of the increased shift amount of said hydraulic pressure piston after the disappearance of the brake clearance divided by the increased amount of the hydraulic pressure.

2. An alarm device in accordance with claim 1, wherein said hydraulic pressure sensing means comprises a pressure sensing piston which is axially movably disposed and exposed on one end surface thereof to the pressure in said hydraulic brake system.

3. An alarm device in accordance with claim 1, wherein said shift amount sensing means comprises a sensing rod which is disposed movably in a parallel direction to the shifting direction of said air pressure piston and abuts said air pressure piston at the moment the same has been shifted up to the brake-clearance-lost position in response to a braking operation when the brake clearance has reached the permissible limit, and thereafter is moved together with said air pressure piston.

4. An alarm device in accordance with claim 3, wherein said hydraulic pressure sensing means comprises a pressure sensing piston which is axially movably disposed and exposed on one end surface thereof to the pressure of said hydraulic brake system, and said warning means comprises spring means disposed between the other end surface of said pressure sensing piston and said sensing rod, an electrical switch which is actuated when said pressure sensing piston is shifted to the side of said one end surface thereof due to the spring force of said spring means becoming larger than a force acting on said pressure sensing piston coming from the hydraulic pressure in said hydraulic brake system, and said alarm device including a warning element for giving an alarm due to an operation of said electrical switch.

5. An alarm device in accordance with claim 4, wherein said pressure sensing piston is provided, on the peripheral surface thereof, with an annular recess portion, in which an actuator of said electrical switch is engaged, whereby said pressure sensing piston concurrently functions as a dog for operating said electrical switch.

6. An alarm device in accordance with claim 1, wherein said hydraulic pressure sensing means comprises a pressure sensing piston which is axially movably disposed and exposed on one end surface thereof to the pressure in said hydraulic brake system, and said warning means comprises a sensing rod and spring means disposed between the other end surface of said pressure sensing piston and said sensing rod, a first electrical switch which is closed when said sensing rod is shifted by said air pressure piston against the spring force of said spring means, a second electrical switch which is closed when said pressure sensing piston is retained at a farthermost alienated position from said sensing rod due to the spring force of said spring means, and an electrical warning element for giving an alarm when both said first electrical switch and said second electrical switch are closed.

7. An alarm device in accordance with claim 6, wherein said pressure sensing piston is abutted onto a fixed electrode carried by an isolator at said farthermost alienated position from said sensing rod, and said pressure sensing piston concurrently functions as a movable electrode for said second electrical switch.

8. An alarm device in accordance with claim 1, wherein said hydraulic pressure sensing means is a first converter for converting hydraulic pressure into a thereto proportioning electric signal, said shift amount sensing means is a second converter for converting shift amount into a thereto proportioning electric signal, and said warning means comprises a comparator which compares a value of the output from said second converter and a value of the product of the output from said first converter multiplied by the rigidity coefficient of said hydraulic brake system, for giving a signal of reaching the permissible limit of the brake clearance when the former value has turned out to be larger than the product of the multiplication, and a warning element which is operated in response to said signal of reaching the permissible limit.

9. An alarm device in accordance with claim 8, wherein said second converter is a differential transformer which comprises a core fixedly attached to said air pressure piston parallel to the shifting direction of said air pressure piston and a coil disposed at a fixed position mating with said core.

10. In an air-over-hydraulic brake system, wherein an air-pressure piston actuated by pressurized air drives a hydraulic piston to produce hydraulic pressure in a hydraulic brake system, and alarm device for giving a warning when a permissible limit of a brake clearance has been reached comprising:

means for producing a first force which is, when said brake clearance has reached a permissible limit thereof, just proportionate with a shift amount of said air pressure piston starting from a position where said brake clearance has been lost under a braking operation;

means for producing a second force which is proportionate with the pressure in said hydraulic brake system and is equal to said first force when said brake clearance has reached the permissible limit thereof; and a warning element for making a comparison between said first force and said second force to give an alarm when the former has turned out to be larger that the latter.

11. In an air-over-hydraulic brake system including brakes wherein an air pressure piston drives a hydraulic piston which operates the brakes, the combination comprising alarm means for producing a warning when brake clearance reaches a predetermined permissible limit, said alarm means comprising sensor means, said sensor means comprising means to sense the position of said air pressure piston and means to sense the said pressure produced by said hydraulic piston, said sensor means comprising means to produce a value proportional to the sensed position of said air pressure piston, means to produce a value proportioned to said sensed hydraulic pressure and means to produce a value proportional to a constant related to the rigidity of said sensor means, and said sensor means comprising means to activate said alarm means when said value proportional to the sensed position of said air pressure piston indicating that said brake clearance limit has been reached or exceeded is greater than a combination of said values proportional to hydraulic pressure and to said constant.

12. The combination of claim 11, wherein said constant is produced by spring means in said sensor means, and said two means to produce said two values comprise a pair of piston means arranged in tandem with said spring means interposed therebetween.

13. The combination of claim 11, wherein said two means to produce said two values comprises two electrical transducer means, one for air piston distance and the other for hydraulic pressure, said transducer means producing two electrical signals respectively, and means to compare said signals including means to produce a signal proportional to said constant for operating said means.

* * * * *